United States Patent
Cao et al.

(10) Patent No.: US 6,850,504 B1
(45) Date of Patent: Feb. 1, 2005

(54) ACCESS TO COMMUNICATIONS SYSTEMS

(75) Inventors: Qiang Cao, Abbey Meads (GB); Lorenz Fred Freiberg, Grange Park (GB); David Jonathan Reader, London (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/181,327

(22) Filed: Oct. 28, 1998

(30) Foreign Application Priority Data

Oct. 31, 1997 (EP) .......................................... 97308747

(51) Int. Cl.[7] .................................................. H04Q 7/22
(52) U.S. Cl. ..................................... 370/335; 370/342
(58) Field of Search ........................ 340/310.1, 310.2, 340/328, 329, 336, 338, 345, 349, 335, 342

(56) References Cited

U.S. PATENT DOCUMENTS

| | | | |
|---|---|---|---|
| 5,206,638 A | 4/1993 | McKeown | 340/825.51 |
| 5,572,546 A | 11/1996 | Serfaty et al. | 375/221 |
| 5,598,417 A | 1/1997 | Crisler et al. | 370/348 |
| 5,751,708 A | 5/1998 | Eng et al. | 370/389 |
| 5,787,483 A | 7/1998 | Jam et al. | 711/158 |
| 5,970,062 A * | 10/1999 | Bauchot | 370/310.2 |
| 6,295,285 B1 * | 9/2001 | Whitehead | 370/245 |

* cited by examiner

Primary Examiner—Melvin Marcelo
(74) Attorney, Agent, or Firm—Matthew J. Hodulik

(57) ABSTRACT

In a code division multiple access (CDMA) wireless system, a wireless terminal transmits information packets to a communications systems controller. Each information packet comprises a piggy back field which indicates to the communication systems controller resources requested by the wireless terminal for transmission of subsequent information packets.

9 Claims, 4 Drawing Sheets

ACCESS TO COMMUNICATIONS SYSTEMS

CROSS-REFERENCE TO RELATED APPLICATION

This application claims priority of European Patent Application No. 97308747.1, which was filed on Oct. 31, 1997.

FIELD OF THE INVENTION

This invention relates to communication systems and more particularly to a method and system for end-user devices to contend for access to shared resources of a communication channel.

BACKGROUND OF THE INVENTION

Recent improvements in multiple access methods allow contending end-user devices access to shared networking resources in an orderly fashion. With the advent of wireless communication networks, many access methods have become unsuitable for allocating shared resources. In particular, the different types of traffic and differing Quality of Service (QoS) requirements of each user can dramatically affect the signal quality (i.e. SNR) achieved by each user. With the diversity of applications which can be made available over a communication network, the problem of assignment of shared resources based on the QoS required by each end-user and the efficient use of bandwidth in a practical communication system become increasingly important. The disadvantages of the existing systems become more acute in mobile wireless communications systems, between a mobile end-user and a base station, especially when an integrated mix of traffic such as speech, audio-visual and data communications are supported in the same channels. The QoS requirements of each end-user may vary dramatically during an established call and the type of traffic between end-users and base stations may vary dynamically.

U.S. Pat. No. 5,751,708 by Mark J. Karol and Kai Y. Eng, and paper "Distributed-Queueing (sic) Request Update Mulitiple Access (DQRUMA) for Wireless Packet (ATM) Networks" by Mark J. Karol, Zhao Liu and Kai Y. Eng., IEEE International Conference on Communications 18–22 June 1995, ICC'95 Seattle, Gateway to Globalization, pages 1224–1231, describe an access method that allows an end-user device to piggyback, with a packet transmission, requests for access to a shared communications resource.

U.S. Pat. No. 5,598,417 A describes a TDM (time division multiplex) wireless communication systems where the only resource is a time slot. The system confines the communication services to two groups. One group deals with voice calls, circuit data connections, and system control information which are transmitted one slot per frame (a frame consists of a number of slots). The other group deals with packet switched data, which is transmitted in the rest of the slots of the frame. The system achieves a flexible transmission rate for a certain service only by allocating different number of slots per frame.

U.S. Pat. No. 5,572,546 describes a random access protocol, which is equivalent to slotted ALOHA and assumes that all terminals are able to listen to each other. This system is inherently unsuitable for mobile cellular system where the mobile terminals can only listen to base stations. The application of the protocol is mainly in multihop modems and coaxial cables.

SUMMARY OF THE INVENTION

According to a first aspect of the invention there is provided a method for an end-user device to request resources in a communication system comprising:

generating a plurality of information packets to be transmitted by said end-user device;

transmitting said information packets, in a sequence, over a communications channel within said communications system, characterised in that each information packet contains a piggy back field which indicates to a communication system controller resources requested by said end-user device for transmission of another information packet in said sequence.

According to a second aspect of the invention there is provided a communication system comprising:

at least one end-user device and a communication channel within said communication system and over which information packets are transmitted, in a sequence, by said end-user device characterised in that each information packet contains a piggyback field which indicates to a communication systems controller resources requested by said end-user device for transmission of another information packet in said sequence.

The information allows a number of end-use devices to transmit over the same communication channel by multiplexing each user's signal in such a way that the aggregate traffic is optimal. Optimal channel throughput may be achieved, having regard to the finite resources available in the communication channel.

One advantage of the invention is that flexibility in the service provided to each end-user device can be achieved with minimum cost, and without employing any additional control channels.

The changing requirements of an end-user device can be accommodated and may include additional or reduced bandwidth. Piggybacking requests for changes in future resources allocation is particularly appropriate for use in a packet switched type communication system which may, depending on the QoS parameter of a particular end-user device, be required to perform like a circuit switch communication system for at least some of the time.

To support a certain service, a mobile terminal requests a certain information data rate, at a certain delay requirement. Hence, the piggybacking field can represent a set of values, representing a range in data rates and delay sensitivities. The base station will use the delay sensitivity value to assign its resources to support the requested data rate, whenever possible.

An air interface has a finite amount of resources with which to support a requested date rate. The air interface can divide its spectrum into frequency segments, time segments, spreading codes, or any combination thereof. More advanced systems are likely to separate the resource spatially through the use of directive antennas. Regardless of how the spectrum allocated to the system is divided, the resource is finite and can only support a finite aggregate data rate, which must be divided amongst the system's many mobile users.

In code division multiple access for example, the correlation between the spreading codes limits the number of codes that can be used. The higher the data rate supported by a code, the greater the correlation of that code with respect to the other codes in the system. Hence the base station must trade off providing a large set of codes each supporting a low data rate, with a small set of codes each supporting a high data rate. The piggybacking fields request for a certain data rate, can be accommodated by the base station simply by allowing the mobile to change to the appropriate code, providing the code resource is available.

BRIEF DESCRIPTION OF THE DRAWINGS

An embodiment of the invention is described, by way of example, with reference to the following figures, in which.

DETAILED DESCRIPTION

Figure 1:
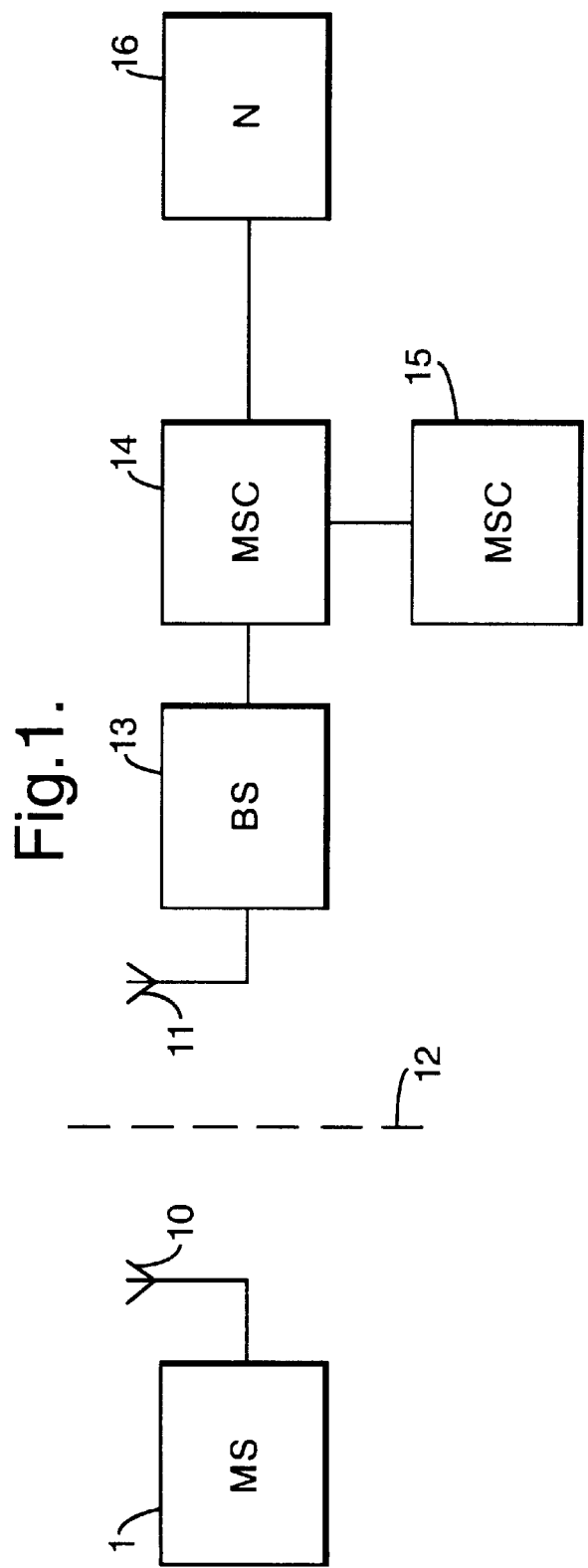
FIG. 1 shows a block diagram of a mobile wireless communication system according to the invention.

An end-user device (Mobile Station 1) may use any one of a number of communication protocols to communicate with a network controller (e.g. base station 13, and mobile switching centre 14), via antennae 10 and 11, across an air interface 12. In the following embodiment, the communication protocol used is CDMA (code division multiple access. This enables the mobile stations to communicate using a coded spread spectrum signal with codes which are almost uncorrelated, thereby providing a multiple access communications protocol in which the collisions are not destructive of other signals broadcast concurrently. Once a communication channel has been established between mobile station 1 and its closest base station 13, the mobile switching centre 14 may establish a further connection to another mobile switching centre 15 or to the public voice or data networks 16.

Figure 2:
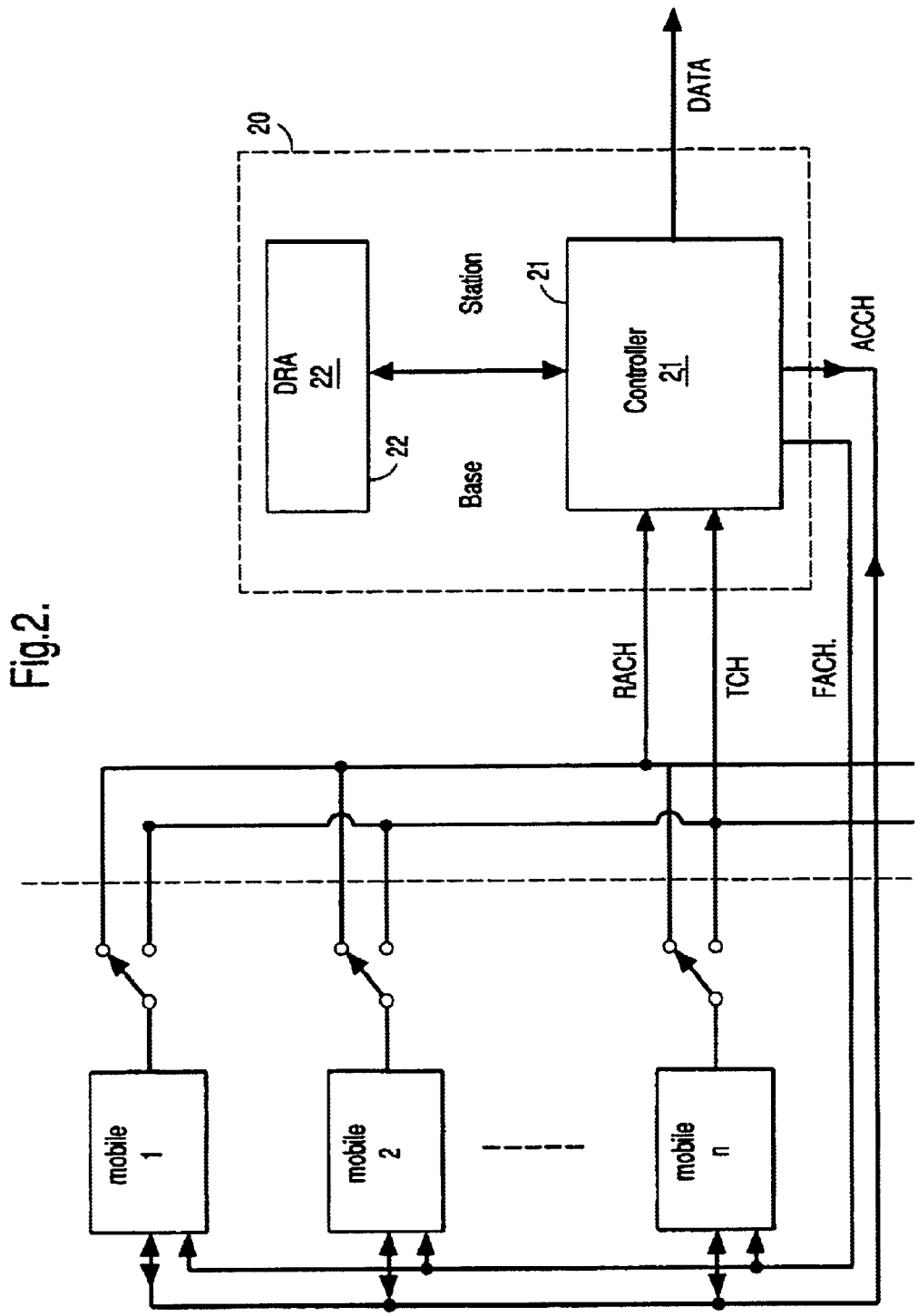
FIG. 2 illustrates the communication channels employed in he embodiments.

FIG. 2 illustrates the logical channels established between n mobile stations (1,2, . . . n) and a base station 20 over the air interface 12, after the mobile stations have been connected to the mobile communications network. Each mobile station (1,2, . . . n) may contend for permission to send a data packet to the system controller 21 using the random access channel RACH. The base station uses a dynamic resource allocation table 22 (DRA) to establish whether sufficient resources are available in the network, and if so, grants permission on the feedback channel to transmit the data packet. The mobile station then transmits the data packet on the traffic channel TCH.

Figure 3:
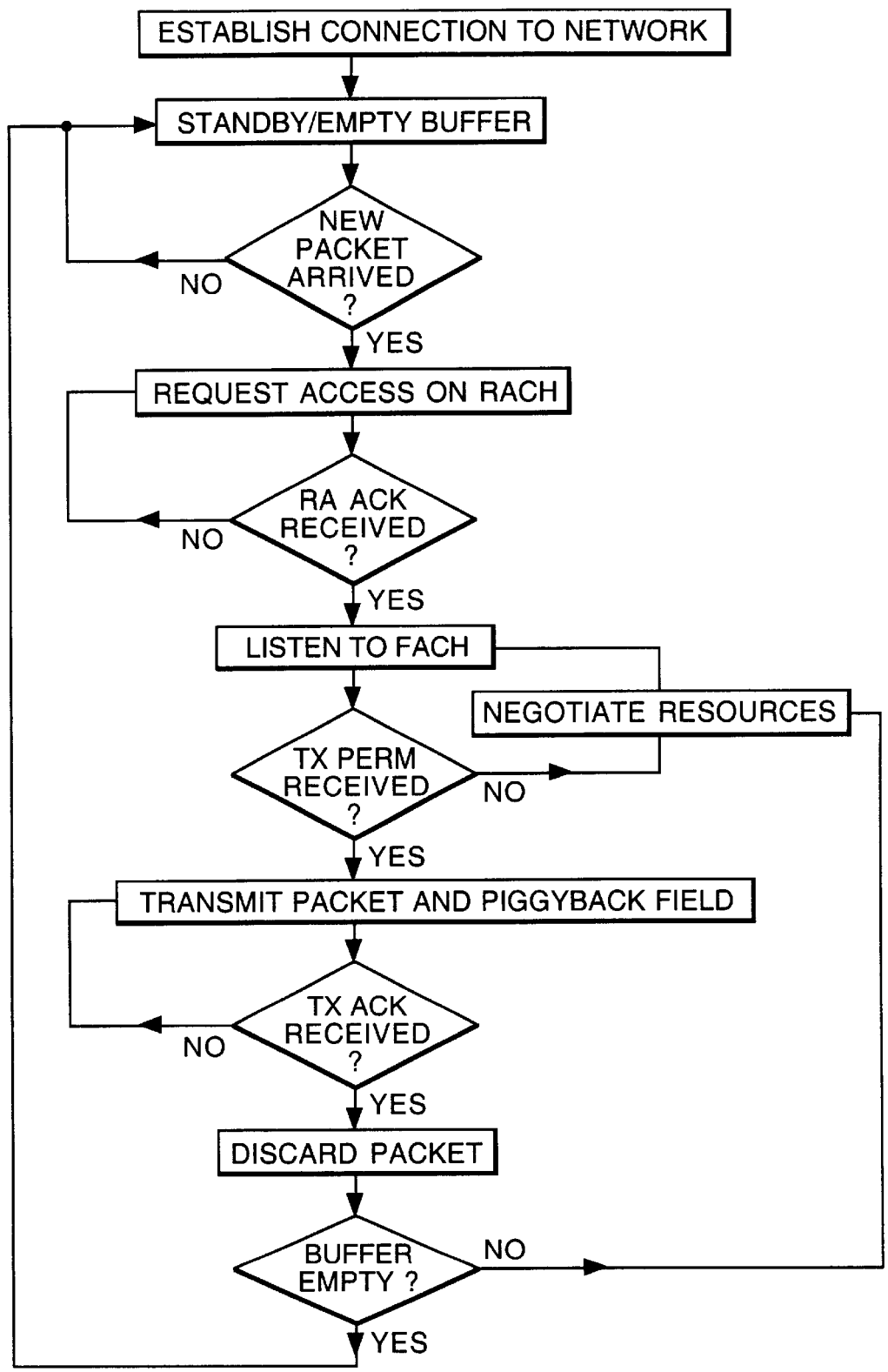
FIG. 3 shows a flow diagram of a mobile wireless communication system according to the invention.
Figure 4:
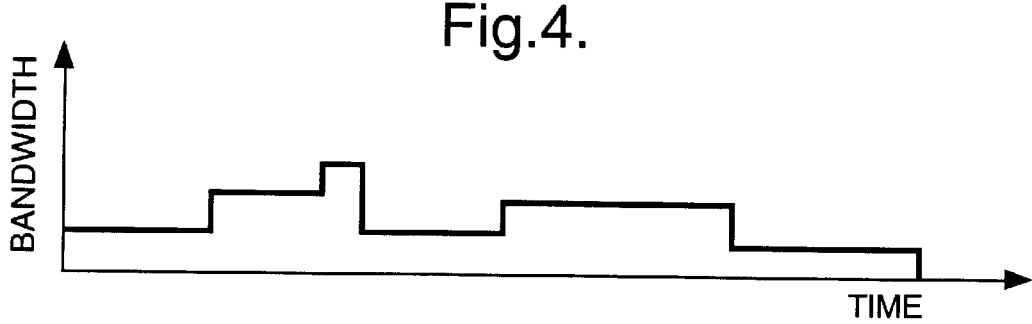
FIG. 4 represents a signal sent over a communications channel of a mobile wireless communication system according to the invention.

FIG. 3 shows in more detail the protocol required to transmit data from the mobile station. Once a connection has been established, the mobile station remains on standby until the user wishes to make a voice call, set up an internet connection, send a fax or an e-mail, or engage in some other data exchange process. Once data has been divided into packets and has arrived in the buffer the mobile station requests a traffic channel by broadcasting a request on the RACH. Since the arrival of requests on the RACH is essentially a random process, an access failure occurs if 1) contending end-user devices happen to select the same code at the same time, giving a code cross correlation below a predetermined threshold (i.e. hard blocking) or 2) if the SNR of the physical channel deteriorates so badly that the requests cannot be decoded (i.e. soft blocking). An access failure requires the end-user device to retransmit the request using a slotted ALOHA back-off and retry protocol. The RACH requests contain the mobile stations access identification (Access ID) and an indication of the Service Requirements (e.g. particular type of traffic required, number of packets etc). Once a RACH request has been successfully decoded, the system controller acknowledges the request (RAAck) on the forward access channel (FACH). The acknowledgement contains the mobile stations Access ID and is transmitted using the same orthogonal code selected by the mobile station. The system controller access the DRA table 22 (which contains the Access ID and Transmit-Requirements for a particular mobile station) and determines the resources available in the communication channel. The system controller 21 negotiates with the mobile station for the use of the resources (e.g. bandwidth, multicodes, spreading factor, data rate, delay etc.) and the QoS threshold required. The Mobile Station then awaits permission to transmit (TxPerm) which indicates that the negotiated resources have been allocated, and that the system controller has updated the DRA table 22 accordingly. The mobile station then transmits the data packet, piggybacking into the data a piggyback field, indicating any change in resources required for transmission of the next or a subsequent packet. These resources may include changes in the bandwidth requirement, leading to a signal bandwidth profile as illustrated in FIG. 4. If time division duplexing (TDD) is used to control the uplink and downlink communications between mobile stations and a base station, the piggyback field can be used to request access in a particular uplink. If a slotted ALOHA protocol is used to govern the timing of packet transmission, the piggyback field can be used to request access in a particular slot. Once a data packet has been successfully received and decoded, the system controller 21 transmits a transmit acknowledgement (TxAck) on the FACH, indicating to the mobile station that the most recently transmitted packet may be discarded from the buffer. The mobile station and the system controller are then able to negotiate any change in resources required by the mobile station and the system controller may update the DRA table as appropriate.

Figure 5:
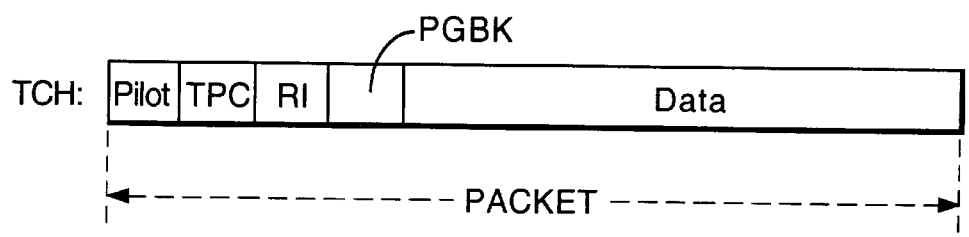
FIG. 5 shows another representation of a signal sent over a mobile wireless communication system according to the invention.

FIG. 5 illustrates a data packet of the type that may be suitable for use in the CDMA protocol described above. The packet commences with some pilot bits (Pilot) which enable the base station to identify the start of a packet, followed by power control bits (TPC), which indicate whether the base station power should be increased or decreased. This is followed by rate information bits (RI) which tells the base station the transmission rate the user wants to use. The piggyback field (PGBK) is inserted before the data.

Figure 6:
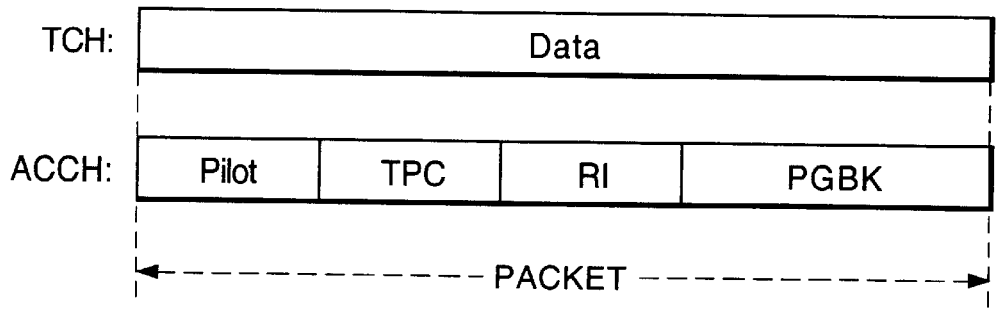
FIG. 6 shows a third representation of a signal sent over a mobile wireless communication system according to the invention.

FIG. 6 shows an alternative type of data packet suitable for use in the CDMA protocol described above. This alternative uses a second two way associated control channel (ACCH), which is established when the traffic channel is allocated. The traffic channel is used to transmit the data, the ACCH transmits the control information (namely Pilot bits, TPC bits, RI bits and the piggyback field PGBK). The data information and the control information are in-phase/quadrature multiplexed.

The foregoing is to be construed as illustrative of the invention, and similar embodiments would be apparent to one skilled in the art. For example, another communications protocol, such as TDMA or FDMA may be used to transmit data packets. In any protocol, the packet transmission can be negotiated dynamically, or if the original allocation proves insufficient, the allocation can be dynamically altered during the call.

What is claimed is:

1. A method for an end-user device to request resources in a code division multiple access (CDMA) communication system comprising:

generating a plurality of information packets to be transmitted by said end-user device;

transmitting said information packets, in a sequence, over a communications channel within said communications system, characterised in that each information packet contains a piggy back field which indicates to a communication system controller resources requested by said end-user device for transmission of another information packet in said sequence, the resources including at least two of the group of data rate, delay and codes.

2. A method as claimed in claim 1 characterised in that the another information packet is the next information packet in said sequence.

3. A method as claimed in claim 1 characterised in that the communication system controller indicates changes in resources allocated to said end-user device.

4. A method as claimed in claim 1, characterised in that the communication system controller indicates changes in resources allocated to said end-user device in accordance with a result of negotiating with a mobile station, and grants permission for the mobile station to transmit.

5. A code division multiple access (CDMA) communication system comprising:

at least one end-user device and a communication channel within said communication system and over which information packets are transmitted, in a sequence, by said end-user device characterised in that each information packet contains a piggy back field which indicates to a communication systems controller resources requested by said end-user device for transmission of another information packet in said sequence, the resources including data rate, delay and codes.

6. A communication system as claimed in claim 4, in which the communication system controller is operative to indicate changes in resources allocated to said end-user device in accordance with a result of negotiating with the mobile station, and grants permission for a mobile station to transmits.

7. A method for an end-user device to request resources in a communication system employing a code divisional multiplex access (CDMA) protocol, the communication system comprising a plurality of a communication system controllers, at least one end-user device, and a communication channel for contending for access to a traffic channel (TCH), said method comprising the steps of:

generating a plurality of information packets to be transmitted by said end-user device;

the end user device transmitting said information packets, in a sequence, over a communications channel within said communication system to a communication system controller, characterized in that each information packet contains a piggyback field which indicates to the communication system controller resources requested by said end-user device for transmission of another information packet in said sequence, the resources including at least data rate, delay, and codes; and the communication system controller indicates changes in resources allocated to said end-user device in accordance with a result of negotiating with the mobile station, and grants permission for a mobile station to transmit.

8. A method as claimed in claim 7 characterized in that the another information packet is the next information packet in said sequence.

9. A communication system employing a code division multiplex access (CDMA) protocol, which includes at least one communication system controller, comprising:

at least one end-user device contending for access, for transmitting packets, on a traffic channel (TCH), which comprises means for transmitting an information packet to a communication system controller including a dynamic resource allocation table, and a communication channel within said communication system and over which information packets are transmitted, in a sequence, by said end-user device characterized in that each information packet contains a piggyback field which indicates to a communications system controller resources requested by said end-user device for transmission of another information packet in said sequence, the resources including at least data rate, delay and codes in order to make the communication system controller update the dynamic resource allocation table in accordance with a result of a negotiation between the end-user device and the communication system controller.

* * * * *